United States Patent [19]

Otani

[11] Patent Number: 4,766,042

[45] Date of Patent: Aug. 23, 1988

[54] PLASTICS PROCESSING MACHINE COMPONENTS AND ALLOY FOR USE THEREIN

[76] Inventor: Tony U. Otani, 6124 Candor St., Lakewood, Calif. 90713

[21] Appl. No.: 19,978

[22] Filed: Feb. 27, 1987

[51] Int. Cl.$^4$ ............... B32B 15/18; C22C 19/05
[52] U.S. Cl. ............... 428/679; 428/680; 420/442; 420/441
[58] Field of Search ............ 420/442, 443, 444, 445, 420/446, 447, 448, 449, 450, 441; 428/679, 680, 684, 685, 592

[56] References Cited

U.S. PATENT DOCUMENTS

| | | | |
|---|---|---|---|
| 3,998,318 | 12/1976 | McAlorney | 428/592 |
| 4,080,201 | 3/1978 | Hodge et al. | 420/446 |
| 4,093,454 | 6/1978 | Saito et al. | 420/449 |
| 4,118,223 | 10/1978 | Acuncius | 420/449 |
| 4,321,229 | 3/1982 | Blakeslee et al. | 425/168 |
| 4,325,994 | 4/1982 | Kitashima et al. | 428/679 |
| 4,430,389 | 2/1984 | Otani | 428/627 |
| 4,536,455 | 8/1985 | Maeda et al. | 428/679 |
| 4,556,607 | 12/1985 | Sastri | 420/442 |

FOREIGN PATENT DOCUMENTS 0031580  7/1981  European Pat. Off. ............ 428/685

OTHER PUBLICATIONS

Spirex "Screw and Barrel Technology" Spirex Corporation 1985, pp. 7–11.
ASME Boiler and Pressure Vessel Code, Part C. 1986. pp. 211–218.

Primary Examiner—L. Dewayne Rutledge
Assistant Examiner—David Schumaker
Attorney, Agent, or Firm—Gregory O. Garmong

[57] ABSTRACT

A plastics processing machine component, such as a lined composite heating cylinder or a hardfaced feed screw, wherein a layer of a hard, corrosion-resistant alloy is joined to a component substrate in the form of the part to be protected. The alloy has a composition, in weight percent, of from about 12 to about 16 percent molybdenum, from about 10 to about 14 percent chromium, up to about 1.2 percent carbon, up to about 3.5 percent silicon, from about 0.5 to about 3.5 percent boron, balance nickel. Such alloys are resistant to corrosion damage from hydrogen chloride and hydrogen fluoride environments, have sufficient fluidity to permit centrifugal casting in the temperature range of 1800° F. to 2250° F., and can be tailored to have hardnesses from about 45 to over 60 $R_c$.

14 Claims, No Drawings

PLASTICS PROCESSING MACHINE COMPONENTS AND ALLOY FOR USE THEREIN

BACKGROUND OF THE INVENTION

This invention relates generally to apparatus used in plastics injection molding and extrusion operations, and more particularly to apparatus having hardfacing coatings for high wear and corrosion resistance.

Injection molding is a process for forming articles from plastics, wherein a melted plastic is forced under pressure into a die cavity to solidify in the shape and size of the cavity. The charge of plastic material to be injected into the die cavity must be heated and pressurized prior to injection, and in one approach the plastic starting material is fed into a hollow cylinder having a feed screw therethrough. As the feed screw turns, the plastic is forced into a heated zone of the cylinder ahead of a check ring on the head of the screw, so that a predetermined volume of heated, pressurized plastic is prepared for subsequent injection into the die cavity by a forward movement of the screw and check ring within the cylinder. A somewhat related process is plastics extrusion, wherein a mass of heated plastic material is continuously forced from a pressurized cylinder through a die by a feed screw, to exit as a desired shape determined by the cross sectional shape of the die.

Because the economics of plastics processing depend upon attainment of long operating lives for the machinery, it is important that the portions of the machinery in contact with the plastic have high resistance to wear and corrosion by the heated plastic material. This combination of good wear resistance and good corrosion resistance is difficult to attain in many situations, and in particular where plastics which produce hydrogen fluoride and/or hydrogen chloride upon heating are used. These two chemicals, the bases for corrosive hydrofluoric and hydrochloric acids, respectively, can result in greatly accelerated corrosion and corrosion wear in the elevated temperature operating environment within the cylinder.

In such plastics processing machinery, should the inside of the cylinder or the outer surfaces of the feed screw wear away under the influences of corrosion and wear from the plastic, a gap develops between the screw and check ring, on the one hand, and the inside diameter of the cylinder, on the other. Plastic material then can leak back from the pressurized zone, with the result that the necessary pressure for injection molding or extrusion will not be attained. The cylinder and/or screw must then be replaced or refurbished, which is expensive and results in an interruption to the economic production process.

Three principal approaches have been taken to provide cylinders and screws having highly wear resistant and corrosion-resistant surfaces, while at the same time retaining the high component strength at elevated temperatures required for the injection molding operation. In one, the inside of a steel cylinder and the outside surface of a feed screw are nitrided, as by exposing the surfaces to be treated to a nitrogen-containing gas such as ammonia, at elevated temperature. This nitriding process results in a relatively thin layer of hardened steel at the protected surface, the layer having improved wear resistance. In a second approach applicable to protecting the feed screw, the outer surface of the screw to be protected is coated with a wear resistant coating using a plasma spray or other convenient coating process.

Another approach, applicable to an improved cylinder, forms a composite cylinder using a centrifugal casting process, wherein ingredients suitable for forming an inner layer within the cylinder are loaded into a premachined cylindrical outer steel housing, the ends are sealed, the housing is placed into a furnace at a temperature sufficiently high to melt at least a portion of the ingredients but not the housing, and the cylindrical housing is then rotated rapidly about its cylindrical axis to distribute the molten ingredients in a continuous layer about the inside of the housing. Upon cooling, the inner layer is metallurgically bonded to the cylindrical outer housing, and the inner layer may then be machined or honed to form a smooth bore of constant diameter to receive the feed screw and check ring therein.

The centrifugal casting process has proved successful for the manufacture of composite cylinders for use in injection molding and extrusion, and a number of alloys have been developed for use in forming the inner lining of the cylinder. Among the materials developed is a heavy-metal alloy of tungsten carbide particles in a nickel-chromium based matrix. The tungsten carbide imparts hardness to the inner layer, and the matrix material binds the tungsten carbide particles, imparts toughness, and allows the fabrication by the centrifugal casting process. Such alloys are disclosed in U.S. Pat. Nos. 3,836,341 and 4,430,389, whose disclosures are herein incorporated by reference. Iron-based alloys, iron-chromium based alloys, iron-nickel based alloys, cobalt-chromium based alloys, cobalt-nickel based alloys, nickel-iron-boron based alloys, and nickel-chromium based alloys are also used in various situations.

None of these alloys has the necessary combination of corrosion resistance, fluidity in the centrifugal casting range, and hardness for wear resistance, that is required to protect injection molding and extrusion components used to process plastics that produce hydrogen fluoride and hydrogen chloride during processing. Accordingly, there has been a need for an improved alloy for use in protecting composite cylinders and hardfaced feed screws. The present invention fulfills this need, and further provides related advantages.

SUMMARY OF THE INVENTION

The present invention provides a plastics processing machine component, such as an internally coated composite cylinder used in injection molding or extrusion, or a hardfaced feed screw, and an alloy used as the coating of such components. The plastics processing components of the invention exhibit excellent corrosion resistance in hydrogen fluoride, hydrogen chloride, and other acidic environments. In particular, the resistance to corrosion and corrosion-wear damage by both hydrogen fluoride and hydrogen chloride in a single alloy is an important feature, as plastics processing machinery is often used in one run for processing a plastic that produces one of these corrosives, and in a successive run with a plastic that produces the other. Shutdowns to change components are avoided by the present approach. In some cases, the plastic produces both of these corrosives, and even others.

The coatings have high hardness to provide excellent wear resistance, with hardnesses in the range of from about 45 to above 60 $R_c$. The alloy of the coating is molten at a temperature of above about 1800° F., and exhibits excellent fluidity and castability in the range of from about 1800° F. to about 2250° F. The alloy may therefore be readily applied as an internal coating within a thick-walled cylinder by centrifugal casting, as well as by conventional hardfacing techniques to a feed screw.

In accordance with the invention, a plastics processing machine injection component comprises a component substrate, and a layer of an alloy joined to the component substrate to protect the substrate, the alloy consisting essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel.

As used herein, a plastics processing machine component is an element of the machine which is exposed to contact with the plastic being heated and processed. Such components include the heating cylinder and feed screw of an injection molding machine, the extrusion barrel and feed screw of a plastics extrusion machine, and possibly other elements of such machines and other machines which process heated plastics.

Many currently used plastics, such as polyvinyl chloride and fluoroplastics, produce corrosive atmospheres during the injection molding operation. The atmospheres are usually acidic, containing hydrogen chloride, hydrogen fluoride, or other acidic compounds. These strongly ionizing acids can produce extensive corrosion of the steel plastics processing machine components. The harmful corrosive effects are accelerated and worsened by the high level of wear of the plastics against the components as the molten plastics are moved through the plastics processing machine. Although plastics are not usually thought of as causing wear, the filled and fiber-containing plastics now used in many applications are highly erosive in their flowable state. Many plastics processing machines are normally operated nearly continuously during production runs, and the combination of the wear due to the moving molten plastic and the corrosive effects can rapidly attack the components, unless they are protected as by the approach of the present invention.

In one preferred embodiment of the invention, a composite cylinder used as the heating cylinder in injection molding or as the extrusion cylinder in plastics extrusion, is prepared by first providing a thick-walled hollow steel cylinder housing having the desired length of the final cylinder, and an inner diameter slightly larger than the desired final inner diameter. Pieces of the alloy material are loaded into the cylinder. A particularly preferred alloy has a composition in weight percent of about 12.7 percent molybdenum, 12.2 percent chromium, about 1.1 percent carbon, about 1.0 percent silicon, about 1.7 percent boron, balance nickel. The alloy pieces are sealed within the premachined housing. The housing is heated to a temperature of from about 1800° F. to about 2250° F., most preferably about 2150° F., so that the alloy within the sealed housing melts. The housing and the melted alloy are rotated about the cylindrical axis at a rate giving a centrifugal force of about 80 times the force of gravity, forcing the molten metal to be distributed uniformly about the inner circumference of the housing. The housing is then gradually cooled, while rotation is continued, so that the alloy is solidified as a generally uniform layer bonded to the inside of the housing along its inside diameter. The composite cylinder is slowly cooled to ambient temperature to minimize undesirable residual stresses. Finally, the inner diameter of the composite cylinder is honed to produce a smooth inner surface of the solidified alloy of the invention. The thickness of the wear resistant inner layer of the alloy of the invention is typically about ⅛ inch, for a composite cylinder having an inside diameter of from 1 to 4 inches. The hardness of this alloy layer is about 60 $R_c$ (Rockwell C scale), which provides excellent wear resistance.

In another preferred embodiment, a coated injection molding or extrusion feed screw is prepared by providing a machined steel screw which is slightly undersized for the desired final application. A layer of the alloy of the invention is applied as a coating to the wearing surfaces of the screw, as by plasma spraying, flame spraying, or other convenient coating operation. The preferred alloy for this application has a composition, in weight percent, of about 13 percent molybdenum, about 12 percent chromium, about 0.5 percent carbon, about 1.0 percent silicon, about 0.7 percent boron, balance nickel. The alloy is applied in a thickness of about ⅛ inch, and has a hardness of about 48 $R_c$. The lower hardness results from the lower carbon and boron contents, within the range of the invention. A lower hardness is selected for the screw so that any wear loss resulting from wear between the feed screw and the cylinder will occur as loss from the screw, which is a less expensive and more easily replaced component than the cylinder.

In accordance with another aspect of the invention, an alloy consists essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel, the alloy being resistant to corrosion from hydrogen chloride and hydrogen fluoride, and having high fluidity in the temperature range of from about 1800° F. to about 2250° F. Preferred alloy compositions are those set forth above.

It will be appreciated that from the foregoing that the present invention represents an advance in the machinery used for processing of heated plastics. With the alloy of the present invention, injection molding components such as composite cylinders and hardfaced screws are prepared to have both excellent corrosion resistance in acidic environments and high wear resistance. The alloy also has the necessary high fluidity and castability in the centrifugal casting range to permit fabrication of composite cylinders by this approach.

Other features and advantages of the present invention will be apparent from the following more detailed description which illustrates, by way of example, the principles of the invention.

DETAILED DESCRIPTION OF THE PREFERRED EMBODIMENT

The present invention is most preferably embodied in a composite cylinder having an outer housing in the form of a hollow, thick-walled cylinder, and a layer of an alloy around the inner circumference of the housing. The alloy preferably has a composition, in weight percent, of about 12.7 percent molybdenum, about 12.2 percent chromium, about 1.1 percent carbon, about 1.0 percent silicon, about 1.7 percent boron, balance nickel.

In this alloy, the molybdenum can range from a low of about 12 to a high of about 16 percent. Lesser amounts of molybdenum result in insufficient corrosion resistance in acidic environments, while greater amounts of molybdenum result in too high a melting point and insufficient fluidity and castability for centrifugal casting. Chromium can range from about 10 to about 14 percent. Lesser amounts reduce corrosion resistance, while greater amounts also adversely affect fluidity and castability. Carbon content can be up to about 1.2 percent, to provide carbon for the formation of carbides for increased strength and hardness. Greater amounts result in the formation of brittle carbides. The presence of up to about 3.5 percent silicon improves fluidity, but greater amounts cause formation of brittle silicides. Boron can be present from about 0.5 to about 3.5 percent. The hardness of the final alloy increases with increasing boron content. Boron content below 0.5 percent results in too low a hardness to provide sufficient wear resistance, while boron above 3.5 percent results in too high a boride content that can cause brittleness.

The alloy can be provided as elemental ingredients, as from powders or chunks. Preferably, the alloy is premelted and broken into pieces. A predetermined weight of the alloy, chosen to give a desired layer thickness, is introduced into a cylinder constituting the outer housing of the composite cylinder used in plastics processing. The outer housing is normally AISI 4140 or 1020 steel, and is commonly produced in size ranges of ½ inch to 14 inches inside diameter, 2 to 18 inches outside diameter, and 20 to 120 inches in length, depending upon the specific production requirements of the plastics processing machinery.

Both ends of the steel cylinder housing having the alloy therein are capped with steel plates welded into position to seal the cylinder, which is then placed into a heating furnace to melt at least a portion of the ingredients, preferably at a temperature of from about 1800° F. to about 2250° F., most preferably 2150° F. At this temperature, the alloy is fully melted and sufficiently fluid to be readily distributed during casting. After the cylindrical housing has been in the furnace a time sufficient to melt the matrix alloy, it is removed from the furnace and placed onto a set of spinning rolls, which turn the cylinder about its cylindrical axis at a rotational rate sufficient to produce a centrifugal force of about 80 times the force of gravity. As the cylinder turns, the melted ingredients are distributed about the inside of the cylindrical housing to form an inner layer therein. Simultaneously, the spinning cylindrical housing is cooled with external water sprays. Eventually, the alloy layer is cooled to below its melting point as the housing is cooled, and solidifies as an evenly distributed solid layer. Following solidification of the alloy, the composite cylinder is removed from the spinning rolls and placed in a slow-cooling pit or furnace for slow cooling to ambient temperature to minimize the residual stresses therein.

The innermost surface of the alloy layer formed upon cooling is typically somewhat rough in texture after the cooling to ambient temperature, as a result of irregularities developed during the solidification step. Additionally, the predetermined weight of the alloy that is melted is selected so that the inner diameter of the alloy layer upon solidification is slightly less than the desired final diameter. To remove the structural irregularities and to provide the finished cylinder with a smooth, polished and properly dimensioned inner diameter, the internal wall of the inner layer of the cylinder is machined or honed to the final size. Although in this preferred embodiment the alloy layer is applied by centrifugal casting, application is not so limited, and may be by any convenient means.

The alloy of the invention can also be used to coat a plastics processing feed screw used in injection molding or extrusion operations. The feed screw is provided as a slightly undersized screw substrate, and a layer of the alloy is applied as a hardfacing to protect the metal, thereby building up the diameter of the screw to the required size. The screw substrate is typically one of the same grades of steel as the cylinder housing. A layer of the alloy is applied by any suitable technique, such as flame spraying or plasma spraying. The composition of the alloy in weight percent is preferably about 13 percent molybdenum, about 12 percent chromium, about 0.5 percent carbon, about 1.0 percent silicon, about 0.7 percent boron, balance nickel. The carbon, silicon, and boron contents are reduced from the preferred levels for the cylinder lining alloy, to give the feed screw coating alloy a lower hardness, typically about 48 $R_c$. The lower hardness is selected to reduce damage to the inner wall of the composite cylinder during operation of the plastics processing equipment, which might otherwise occur by wear or galling between the screw and the cylinder lining. It is preferred that any damage that might occur as between the screw and the cylinder be concentrated in the screw, as the screw is less expensive and faster to replace.

An alloy of the invention has been tested comparatively with other candidate cylinder lining materials for corrosion damage in accelerated hydrogen chloride and hydrogen fluoride testing. Carefully weighed samples of the alloys were placed into a fifty percent concentration solution of hydrochloric acid, and other weighed samples were placed into fifty percent concentration solutions of hydrofluoric acid, all tests conducted at ambient temperature. After a sufficient period of time that measurable removal of material had occurred, the samples were removed and weighed.

The alloy of the invention that was tested had a composition in weight percent of 12.69 percent molybdenum, 12.23 percent chromium, 1.1 percent carbon, 0.98 percent silicon, and 1.75 percent boron, balance nickel. Comparative alloy A, a commercially available cylinder lining material, had a composition in weight percent of 0.33 percent carbon, 1.75 percent silicon, 1.0 percent manganese, 8.5 percent chromium, 2.5 percent boron, 41 percent nickel, balance cobalt. Comparative alloy B was Colmonoy 6, having a composition in weight percent of 0.75 percent carbon, 13.5 percent chromium, 4.25 percent silicon, 4.75 percent iron, 3.0 percent boron, balance nickel. The results are normalized to a rate of loss of material of 1.0 for the alloy of the invention, and the rate of loss of material for the other alloys are a ratio thereto. Comparative results for the rates of loss of material were:

| Acid | Invention | A | B |
| --- | --- | --- | --- |
| Hydrofluoric | 1.00 | 3.33 | 1.89 |
| Hydrochloric | 1.00 | 16.40 | 0.76 |

The alloy of the present invention is significantly better than either other material in hydrofluoric acid, and much better than alloy A in hydrochloric acid. Alloy B is slightly better than the alloy of the invention in hydrochloric acid, but the absolute rate of material removal was sufficiently low for both alloys that the improvement of alloy B over the invention is not considered significant. In sum, the alloy of the invention is judged to give superior performance in resisting damage during acidic environment exposure.

The plastics processing components of the invention incorporate a protective coating material that has high hardness and excellent corrosion resistance in acidic environments. The alloy can be centrifugally cast, so that internal linings within cylinders can be prepared by this technique. Although a particular embodiment of the invention is described in detail for purposes of illustration, various modifications can be made without departing form the spirit and scope of the invention. Accordingly, the invention is not to limited except as by the appended claims.

What is claimed is:

1. An plastics processing machine component, comprising:
   a component substrate; and
   a layer of an alloy joined to said component substrate to protect said substrate, said alloy consisting essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel.

2. The machine component of claim 1, wherein said alloy consists essentially of about 12.7 percent molybdenum, about 12.2 percent chromium, about 1.1 percent carbon, about 1.0 percent silicon, about 1.7 percent boron, balance nickel.

3. The machine component of claim 1, wherein said alloy consists essentially of about 13 percent molybdenum, about 12 percent chromium, about 0.5 percent carbon, about 1.0 percent silicon, about 0.7 percent boron, balance nickel.

4. A composite cylinder, comprising:
   an outer housing; and
   a layer of an alloy around the inner circumference of said housing, said alloy consisting essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel.

5. The composite cylinder of claim 4, wherein said alloy consists essentially of about 12.7 percent molybdenum, about 12.2 percent chromium, about 1.1 percent carbon, about 1.0 percent silicon, about 1.7 percent boron, balance nickel.

6. The composite cylinder of claim 4, wherein said composite cylinder is an injection molding heating cylinder.

7. The composite cylinder of claim 4, wherein said composite cylinder is an extrusion cylinder.

8. A composite hardfaced feed screw, comprising:
   a screw substrate; and
   a layer of an alloy on the outer surface of said screw substrate, said alloy consisting essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel;

9. The feed screw of claim 8, wherein said alloy consists essentially of about 13 percent molybdenum, about 12 percent chromium, about 0.5 percent carbon, about 1.0 percent silicon, about 0.7 percent boron, balance nickel.

10. The feed screw of claim 8, wherein said feed screw is an injection molding feed screw.

11. The feed screw of claim 8, wherein said feed screw is an extrusion feed screw.

12. An alloy consisting essentially of, in weight percent, from about 12 to about 16 percent molybdenum, from about 10 to about 14 percent chromium, up to about 1.2 percent carbon, up to about 3.5 percent silicon, from about 0.5 to about 3.5 percent boron, balance nickel, said alloy being resistant to corrosion from hydrogen chloride and hydrogen fluoride, and having high fluidity in the temperature range of from about 1800° F. to about 2250° F.

13. The alloy of claim 12, consisting essentially of about 12.7 percent molybdenum, about 12.2 percent chromium, about 1.1 percent carbon, about 1.0 percent silicon, about 1.7 percent boron, balance nickel.

14. The alloy of claim 12, consisting essentially of about 13 percent molybdenum, about 12 percent chromium, about 0.5 percent carbon, about 1.0 percent silicon, about 0.7 percent boron, balance nickel.

* * * * *